United States Patent [19]

Larsson et al.

[11] Patent Number: 5,956,642
[45] Date of Patent: *Sep. 21, 1999

[54] ADAPTIVE CHANNEL ALLOCATION METHOD AND APPARATUS FOR MULTI-SLOT, MULTI-CARRIER COMMUNICATION SYSTEM

[75] Inventors: Per Åke Larsson, Sollentuna; Carl Magnus Frodigh, Kista; Knut Magnus Almgren, Sollentuna, all of Sweden

[73] Assignee: Telefonaktiebolaget L M Ericsson, Sweden

[ * ] Notice: This patent is subject to a terminal disclaimer.

[21] Appl. No.: 08/755,966

[22] Filed: Nov. 25, 1996

[51] Int. Cl.$^6$ .................................................. H04B 1/00
[52] U.S. Cl. ............................ 455/449; 455/452
[58] Field of Search ...................... 455/450, 451, 455/452, 464, 509, 513; 370/329, 330

[56] References Cited

U.S. PATENT DOCUMENTS

| | | | |
|---|---|---|---|
| 3,764,915 | 10/1973 | Cox et al. | 455/452 |
| 5,047,762 | 9/1991 | Bruckert | 455/443 |
| 5,276,908 | 1/1994 | Koohgoli et al. | 455/454 |
| 5,497,505 | 3/1996 | Koohgoli et al. | 455/452 |
| 5,530,917 | 6/1996 | Andersson et al. | 455/450 |
| 5,574,974 | 11/1996 | Almgren et al. | 455/450 |
| 5,708,973 | 1/1998 | Ritter | 455/62 |
| 5,726,978 | 3/1998 | Frodigh et al. | 455/63 |

FOREIGN PATENT DOCUMENTS

| | | | |
|---|---|---|---|
| 9501706 | 1/1995 | WIPO | H04Q 7/02 |
| 9510144 | 4/1995 | WIPO | H04B 7/12 |
| 9531879 | 11/1995 | WIPO | H04Q 7/22 |
| 9701256 | 1/1997 | WIPO | H04Q 7/38 |

OTHER PUBLICATIONS

ISR PCT/SE97/01964 dated Jul. 30, 1998.
Iera, A., et al.: "Transport and Control Issues in Multimedia Wireless Networks" *Wireless Networks*, vol. 2, No. 3, Aug. 1996, pp. 249–261.

*Primary Examiner*—Reinhard J. Eisenzopf
*Assistant Examiner*—Makoto Aoki
*Attorney, Agent, or Firm*—Jenkins & Gilchrist, P.C.

[57] ABSTRACT

A method and system of adaptive channel allocation in a multi-carrier, multi-slot system is provided. In the method and system a subset of M channels is chosen from a larger set of N channels available for communications on a link. As communications take place on the link, signal quality (C/I) measurements on the channels of the subset of M channels and interference (I) measurements on the channels of the group of N channels are periodically performed. The C/I and I measurements are then used to reconfigure the subset of M channels to reduce co-channel interference on the link.

18 Claims, 11 Drawing Sheets

ADAPTIVE CHANNEL ALLOCATION METHOD AND APPARATUS FOR MULTI-SLOT, MULTI-CARRIER COMMUNICATION SYSTEM

CROSS-REFERENCE TO RELATED APPLICATIONS

The present invention is related to co-pending and commonly-assigned patent application Ser. No. 08/493,489, filed on Jun. 22, 1995, the contents of which are incorporated by reference herein.

BACKGROUND OF THE INVENTION

1. Field of the Invention

The present invention relates to cellular telecommunications systems. More particularly, the present invention relates to a method and system of adaptive channel allocation in a multi-slot, multi-carrier communication system.

2. Description of the Prior Art

In a cellular telecommunications system the user of a mobile station communicates with the system through a radio interface while moving about the geographic coverage area of the system. The radio interface between the mobile station and system is implemented by providing base stations dispersed throughout the coverage area of the system, each capable of radio communication with the mobile stations operating within the system. In a typical cellular telecommunications system each base station of the system controls communications within a certain geographic coverage area termed a cell, and a mobile station which is located within a particular cell communicates with the base station controlling that cell. As a mobile station moves throughout the system control of the communication between the system and mobile station are transferred from cell to cell according to the movement of the mobile station throughout the system.

Existing cellular telecommunications systems operate according to various air interface standards which assure the compatibility of equipment designed to operate in a particular system. Each standard provides specific details of the processes that take place between the mobile stations and base stations of the system in all modes of operation, including during idle states, during rescan of control channels, during registration, and during connection to voice or traffic channels. Advances in cellular systems technology have been rapid in recent years. These advances in technology have been driven by increases in demand for the increasingly sophisticated services offered by cellular systems. As cellular systems technology and the total number of cellular systems has increased worldwide to meet this demand, there has also been an accompanying increase in the number of system standards according to which these cellular systems operate.

In cellular telecommunications systems, as in most radio systems, the frequency bandwidth available for use is a limited resource. Because of this, emphasis is often concentrated on making the most efficient use possible of the available frequency bandwidth when developing new cellular systems. Additionally, communications within cellular systems are often subject to certain types of RF signal distortion such as multipath propagation and co-channel interference. The development of new system standards has also emphasized the need to minimize the effect of these RF signal distortions on communications within the cells of a system.

Frequency division multiplexing (FDM) is a method of transmitting data that has application to cellular systems. Orthogonal frequency division multiplexing (OFDM) is a particular method of FDM that is particularly suited for cellular systems. An OFDM signal consists of a number of subcarriers multiplexed together, each subcarrier at a different frequency and each modulated by a signal which varies discretely rather than continuously.

OFDM offers several advantages that are desirable in a cellular system. In OFDM the orthogonality of the subcarriers in the frequency spectrum allows the overall spectrum of an OFDM signal to be close to rectangular. This results in efficient use of the bandwidth available to a system. OFDM also offers advantages in that interference caused by multipath propagation effects is reduced. Multipath propagation effects are caused by radio wave scattering from buildings and other structures in the path of the radio wave. Multipath propagation may result in frequency selective multipath fading. In an OFDM system the spectrum of each individual data element normally occupies only a small part of the available bandwidth. This has the effect of spreading out a multipath fade over many symbols. This effectively randomizes burst errors caused by the frequency selective multipath fading, so that instead of one or several symbols being completely destroyed, many symbols are only slightly distorted. Additionally, OFDM offers the advantage that the time period T may be chosen to be relatively large as compared with symbol delay time on the transmission channel. This has the effect of reducing intersymbol interference caused by receiving portions of different symbols at the same time.

The use of OFDM in cellular systems has been proposed by Cimini, "Analysis and Simulation of a Digital Mobile Channel Using Orthogonal Frequency Division Multiplexing", *IEEE Trans. Commun.*, Vol. 33, No. 7, pp. 665–675 (July, 1985). A similar application of OFDM in a mobile system has also been proposed by Casa, "OFDM for Data Communication Over Mobile Radio FM-Channels-Part I: Analysis and Experimental Results", *IEEE Trans. Commun.*, Vol. 39, No. 5, pp. 783–793 (May, 1991). In these OFDM cellular systems a set of subcarrier frequencies is assigned to each communications link created for transmission from a base station to a mobile station (downlink) and from a mobile station to a base station (uplink) operating within a cell. The set of subcarrier frequencies allocated to each communications link is chosen from all subcarrier frequencies available to the system. Within a cell the same subcarrier frequency cannot be assigned to more than one communications link. Thus, co-channel interference between subcarriers within the same cell does not occur. However, it is possible in such an OFDM system that a communications link in a cell of the system is assigned a set of subcarriers frequencies that includes one or more subcarriers frequencies also assigned to a communications link set up in another cell within the system. Each of these commonly assigned subcarriers frequencies may be subject to co-channel interference caused by the use of the same subcarrier frequency in the other cells. In these OFDM systems no method or system exists for coordinating the assignment of subcarrier frequencies to communications links created within different cells. In such a system the co-channel interference in a communications link caused by a subcarrier used in a neighboring cell could be very large.

Methods of allocating channel frequencies among cells in non-OFDM systems have been developed that reduce or minimize co-channel interference. Adaptive Channel Allocation (ACA) is such a method. In ACA any channel frequency allocated to a cellular system may be used to set up a link in any cell of the system regardless of whether or not the frequency is used elsewhere in the system as long as certain interference criteria are met. The channel frequencies may also be freely reused throughout the system as long as the interference criteria are met.

In Adaptive Channel Allocation various measurements of signal quality and interference levels on dynamically allocated channels are performed within the coverage area of a cell to build a list of traffic or voice channels that may be assigned to communications links to be created within the cell. The base station controlling the cell and mobile stations within the cell's coverage area perform measurements on the set of channel frequencies that the system operator has allocated to be dynamically allocated for communications within the system. Generally, both uplink and downlink measurements are performed. Based on these measurements, when a new link is to be created, channels are assigned to the link based on some rule. For example, in minimum interference ACA the system builds a table of channels from the least interfered (highest quality) to the most interfered (lowest quality) channels as measured within each cell. The system then selects a certain number of least interfered channel frequencies from that list to allocate communications in that cell. Other criteria, such as certain required frequency separation between the channels chosen and avoiding certain combinations of channels whose frequencies create intermodulation are also considered. As an example of ACA, H. Eriksson, "Capacity Improvement by Adaptive Channel Allocation", *IEEE Global Telecomm. Conf.*, pp. 1355–1359, Nov. 28-Dec. 1, 1988, illustrates the capacity gains associated with a cellular radio system where all of the channels are a common resource shared by all base stations. In the above-referenced report, the mobile measures the signal quality of the downlink, and channels are assigned on the basis of selecting the channel with the highest carrier to interference ratio (C/I level).

The aforementioned, co-pending patent application discloses a manner by which to adaptively allocate channels in a communication system, such as a communication system which utilizes frequency division multiplexing (FDM) or an orthogonal frequency division multiplexing (OFDM) system. Of the communication channels available upon which to transmit communication signals, only selected channels are used to transmit the signals. As channel conditions change, the channels selected to be used can also change. By adaptively allocating the channels used to transmit a communication signal by a transmitting station, better assurances are provided that the communication will be adequately effectuated. The channels are adaptively allocated in a manner which limits the amount of system resources required to evaluate the channel conditions of the available channels.

Frequency division, time division multiplexing (FD/TDMA) is also a method of transmitting data that has application to cellular systems. An FD/TDMA signal is transmitted in bursts upon a selected carrier during selected time slot.

In a multi-carrier, multi-slot communication system, an FD/TDMA signal can be transmitted on a selected number of channels, each formed of a carrier and time slot combination. In such a communication system, channels, each formed of a carrier and time slot combination are assigned to a communication link formed between a transmitter and a receiver.

Analogous to the channels defined in a FDM communication system, the channels defined in a multicarrier, multi-slot communication system are also susceptible to co-channel interference. And, signals generated upon such channels are susceptible to frequency-selective multi-path fading. As a result, the channels assigned to a communication link in a multi-carrier, multi-slot communication system might not exhibit identical characteristics.

It would provide an advantage then, to have a method and system of adaptive channel allocation for use in an a multi-carrier, multi-slot communication system. The method and system should provide an allocation of channels within a multi-carrier, multi-slot system that lessens co-channel interference between cells of the system. The method and system should also be designed to take into account the unique features of the multi-carrier, multi-slot system in order to utilize system resources effectively when allocating channels.

It is in light of this background information related to multi-slot, multi-carrier communication schemes that the significant improvements of the present invention have evolved.

SUMMARY OF THE INVENTION

The present invention provides a method and system of adaptive channel allocation (ACA) in a multi-carrier, multi-slot communication system. The method and system provides an allocation of channels formed of carrier and time slot combinations assigned to a communication link in which co-channel interference between cells of the system is lessened.

Conventional ACA methods are designed to adaptively allocate RF channels to systems where one channel is used per link. As applied to a multi-carrier, multi-slot communication system, these conventional ACA methods would require that all channels assigned to a link to be adaptively allocated. Adaptively allocating all of such carriers would require an overly large amount of measurement and signaling resources to transfer channel measurement information and the assignment information between receivers and transmitters of the system. By selectively choosing the channels to be adaptively allocated, and setting criteria for allocation determination, the apparatus and method of the present invention minimizes the use of measurement and signaling resources while still providing effective ACA.

In a first aspect of the invention, an initial subset of M channels is chosen from a larger group of N channels that are available for communications on each separate link of the multi-carrier, multi-slot system. The number M depends, for example, on the data rate of the particular link and may vary between the links of the system. The subset of M channels is then used to carry communications on the link. As communications take place, the signal quality level (C/I) of the channels within the subset of M channels, and the interference level (I) of all N available channels is periodically measured. These C/I and I measurement results are reported to the system. During communications on the link the system determines from the C/I and I measurements if at least one more preferred unused channel which would give better signal reception on the link than at least one channel of the set of M is available in the cell within which the link exists. If it is determined that at least one more preferred unused channel exists, the system reconfigures the subset of M channels to include the at least one unused channel.

In a second aspect of the invention, a mobile station as link receiver transmits only a limited set of measurement results to the system at certain select reporting intervals rather than all measurement results. The transmitted limited set of measurement results comprises a select number of the lowest C/I measurement results and a select number of the lowest I measurement results. The transmission of the limited set of results reduces the use of uplink system signaling resources.

In an alternative embodiment of the invention a mobile station as link receiver periodically measures the signal quality level (C/I) of the channels within the subset of M channels, and the interference level (I) of all N available channels. The mobile station then determines candidate replacement channels for the link based on the C/I and I measurements, and transmits a channel request message to the system requesting that the at least one candidate channel be assigned to replace at least one channel of the link. The system responds to the channel request message with a channel accepted or channel rejected message. If a channel accepted message is received, the mobile station reconfigures the subset of M channels to contain the candidate replacement channel. If the channel is rejected, the mobile station transmits a channel request message requesting a new candidate channel.

DETAILED DESCRIPTION OF THE INVENTION

Figure 1:
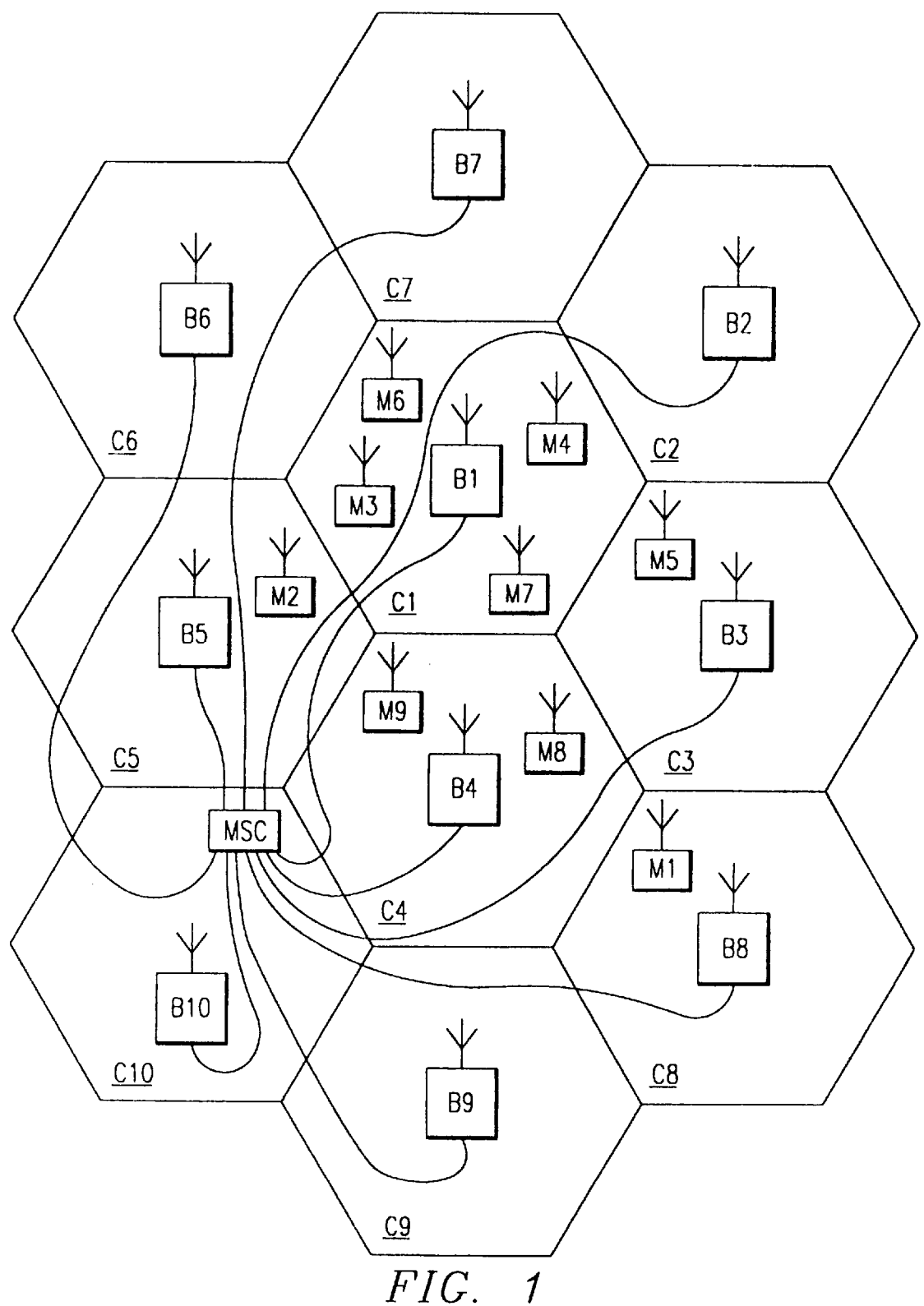
FIG. 1 illustrates a cellular telecommunications network within which the present invention may be implemented.

Referring to FIG. 1, there is illustrated a multi-slot cellular telecommunications system of the type to which the present invention generally pertains. Frequency-division, time-division multiple access (FD/TDMA) signals are generated and transmitted during operation of the system. In FIG. 1, an arbitrary geographic area may be divided into a plurality of contiguous radio coverage areas, or cells C1–C10. While the system of FIG. 1 is illustratively shown to include only 10 cells, it should be clearly understood that in practice, the number of cells will be much larger.

Associated with and located within each of the cells C1–C10 is a base station designated as a corresponding one of a plurality of base stations B1–B10. Each of the base stations B1–B10 includes a transmitter, a receiver, and a base station controller as are well known in the art. In FIG. 1, the base stations B1–B10 are illustratively located at the center of each of the cells C1–C10, respectively, and are equipped with omni-directional antennas. However, in other configurations of the cellular radio system, the base stations B1–B10 may be located near the periphery, or otherwise away from the center of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of the cellular telecommunications system within which the present invention is implemented.

With continuing reference to FIG. 1, a plurality of mobile stations M1–M10 may be found within the cells C1–C10. Again, only 10 mobile stations are shown in FIG. 1 but it should be understood that the actual number of mobile stations will be much larger in practice and will invariably greatly exceed the number of base stations. Moreover, while none of the mobile stations M1–M10 may be found in some of the cells C1–C10, the presence or absence of the mobile stations M1–M10 in any particular one of the cells C1–C10 should be understood to depend in practice on the individual desires of the users of mobile stations M1–M10 who may roam from one location in the cell to another or from one cell to an adjacent cell or neighboring cell, and even from one cellular radio system served by a particular MSC to another such system.

Each of the mobile stations M1–M10 is capable of initiating or receiving a telephone call through one or more of the base stations B1–B10 and a mobile station switching center MSC. A mobile station switching center MSC is connected by communication links, e.g., cables, to each of the illustrative base stations B1–B10 and to the fixed public switched telephone network PSTN, not shown, or a similar fixed network which may include an integrated system digital network (ISDN) facility. The relevant connections between the mobile station switching center MSC and the base stations B1–B10, or between the mobile station switching center MSC and the PSTN or ISDN, are not completely shown in FIG. 1 but are well known to those of ordinary skill in the art. Similarly, it is also known to include more than one mobile station switching center in a cellular radio system and to connect each additional mobile station switching center to a different group of base stations and to other mobile station switching center via cable or radio links.

Each MSC may control in a system the administration of communication between each of the base stations B1-B10 and the mobile stations M1–M10 in communication with it. As a mobile station roams about the system, the mobile station registers its location with the system through the base station that controls the area in which the mobile station is located. When the mobile station telecommunications system receives a call addressed to a particular mobile station, a paging message addressed to that mobile station is broadcast on control channels of the base stations which control the area in which the mobile station is believed to be located. Upon receiving the paging message addressed to it, the mobile station scans system access channels and sends a page response to the base station from which it received the strongest access channel signal. The process is then initiated to create the call connection. The MSC controls the paging of a mobile station believed to be in the geographic area served by its base stations B1–B10 in response to the receipt of a call for that mobile station, the assignment of radio channels to a mobile station by a base station upon receipt of a page response from the mobile station, as well as the handoff communications with a mobile station from one base station to another in response to the mobile station traveling through the system, from cell to cell, while communication is in progress.

Each of the cells C1–C10 is allocated a plurality of traffic channels and at least one dedicated control channel. The control channel is used to control or supervise the operation of mobile stations by means of information transmitted to and received from those units. Such information may include incoming call signals, outgoing call signals, page signals, page response signals, location registration signals and voice and traffic channel assignments.

An embodiment of the present invention involves implementation of a method and system of adaptive channel allocation (ACA) into a multi-carrier, multi-slot cellular system as shown in FIG. 1. In an exemplary embodiment of the invention, ACA is implemented into a multi-carrier, multi-slot communication system having carriers spaced-apart by frequencies and time slots defined pursuant to the Global System for Mobile communications (GSM) specification standards. All channels of an available set of channels are available for use in each cell but a channel may not be used simultaneously on more than one link in a cell. In one embodiment, frequency division duplex (FDD) is used for separation of the uplink and downlink channels. The system includes a dedicated control channel (DCCH) that is both an uplink and downlink channel for transmitting control information for handovers, long term channel allocation information, long term power control information and measurement messages and measurement results. The system also includes a physical control channel (PCCH) that is both an uplink and downlink channel for transmitting short term channel allocation information, short term power control information, measurement messages and measurement results.

In the ACA of the invention, for each up/down link between a mobile station and base station, the system chooses a subset of a number (M) of channel from set of a number (N) of channels. The set of N channels is the set of channels available within the system for each link, where N>M. The set of N channels does not change during a communication. The set of N channels may include all channels of the system. Alternatively, the set of N channel may be a set less in number than the total number of channels available but greater in number than the number of channels in the subset of M channels.

Figure 2A:
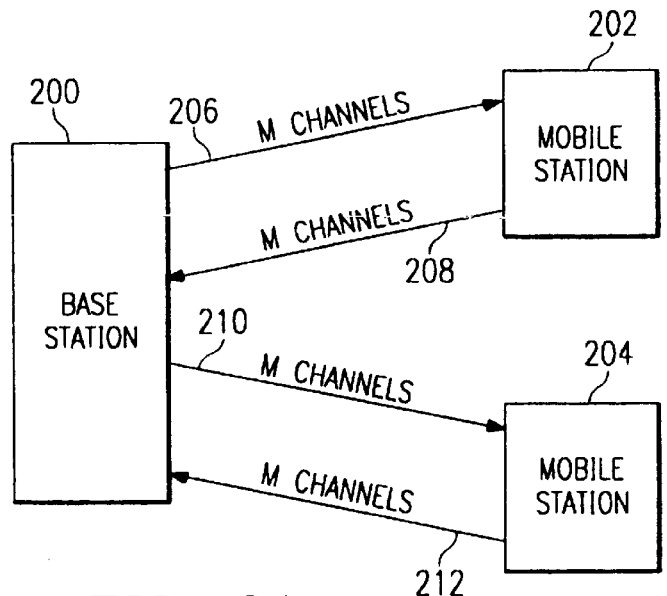
FIG. 2A illustrates the allocation of channels in accordance with an embodiment of the present invention in a multi-slot, multi-carrier communication system.

Referring now to FIG. 2A, therein is illustrated the allocation of channels in accordance with an embodiment of the present invention, a multi-carrier, multi-slot communication system. Base station 200 communicates with mobile station 202 over downlinks 206 and uplinks 208. Base station 200 also communicates with mobile station 204 over downlinks 210 and uplinks 212. Transmissions on links 206,208, 210, and 212, within the cell uses a separate subset of M channels. The channels are used once within a cell.

The communication system of which the base station 200 and mobile stations 202 and 206 form portions may, for instance, comprise a GSM (General System for Mobile communications) communication system. In a GSM communication system, selection of a downlink channel is determinative of selection of an uplink channel. In other systems, the downlink and uplink channels are, instead, not synchronously determined. And, the communication system may also, for instance, comprise a time division duplexed system, such as a Digital European Cordless Telephone (DECT) system in which the same channel sets are used for both uplinks and downlinks.

Figure 2B:
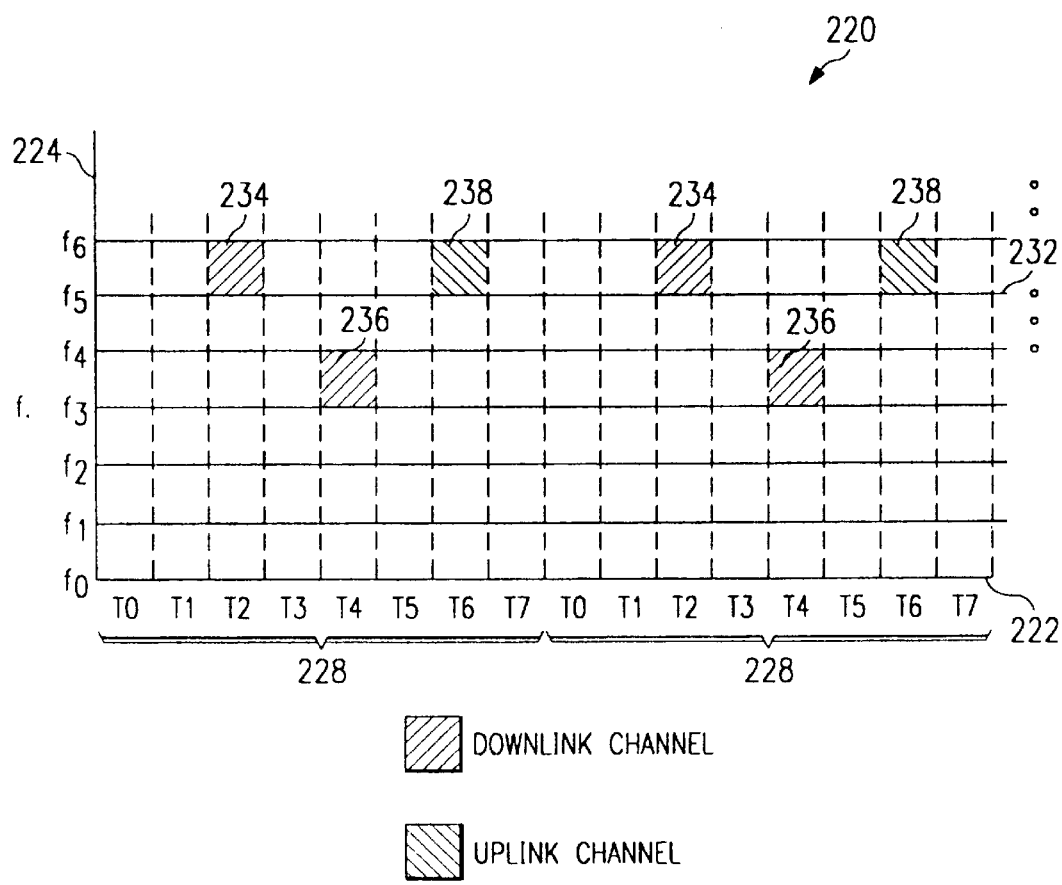
FIG. 2B illustrates graphically the channel scheme of an exemplary multi-slot, multi-carrier communication system.

FIG. 2B illustrates the channel scheme of an exemplary multi-carrier, multi-slot communication scheme, shown generally at 220. The communication scheme is represented graphically and is represented in terms of a time axis 222 and a frequency axis 224.

The time axis 222 represents two frames 228, exemplary of a TDMA (time division, multiple access) communication scheme. Each frame 228 is divided into eight time slots, T0–T7.

The frequency axis 224 represents the bandwidth available to a link in the communication scheme. The available bandwidth is divided into carriers 232. In the exemplary scheme shown in the figure, the carriers are spaced-apart by 200 kHz spacings.

A channel is formed of a time slot, carrier combination. A first channel 234 is highlighted in the figure, defined by time slot T2 and carrier f5. A signal is transmitted in bursts during successive frames of the channel defined in such manner.

A second channel 236 is also highlighted in the figure, defined by time slot T4 and carrier f3. A signal is transmitted in bursts during successive frames of the channel defined in such manner. The channels 234 and 236 can together be used, for example, to transmit downlink signals.

FIG. 2B represents a time division duplex scheme in which both downlink and uplink channels are defined on the same set of carriers. Here, a third channel 238 is also highlighted in the figure, defined by time slot T6 and carrier f5. A signal is also transmitted in bursts during successive frames of the channel defined in such a manner.

A downlink channel, for instance, is defined by the channels 234 and 236. And an uplink channel, for instance, is defined by the channel 238, thereby to define a time division duplex scheme.

Figure 2C:
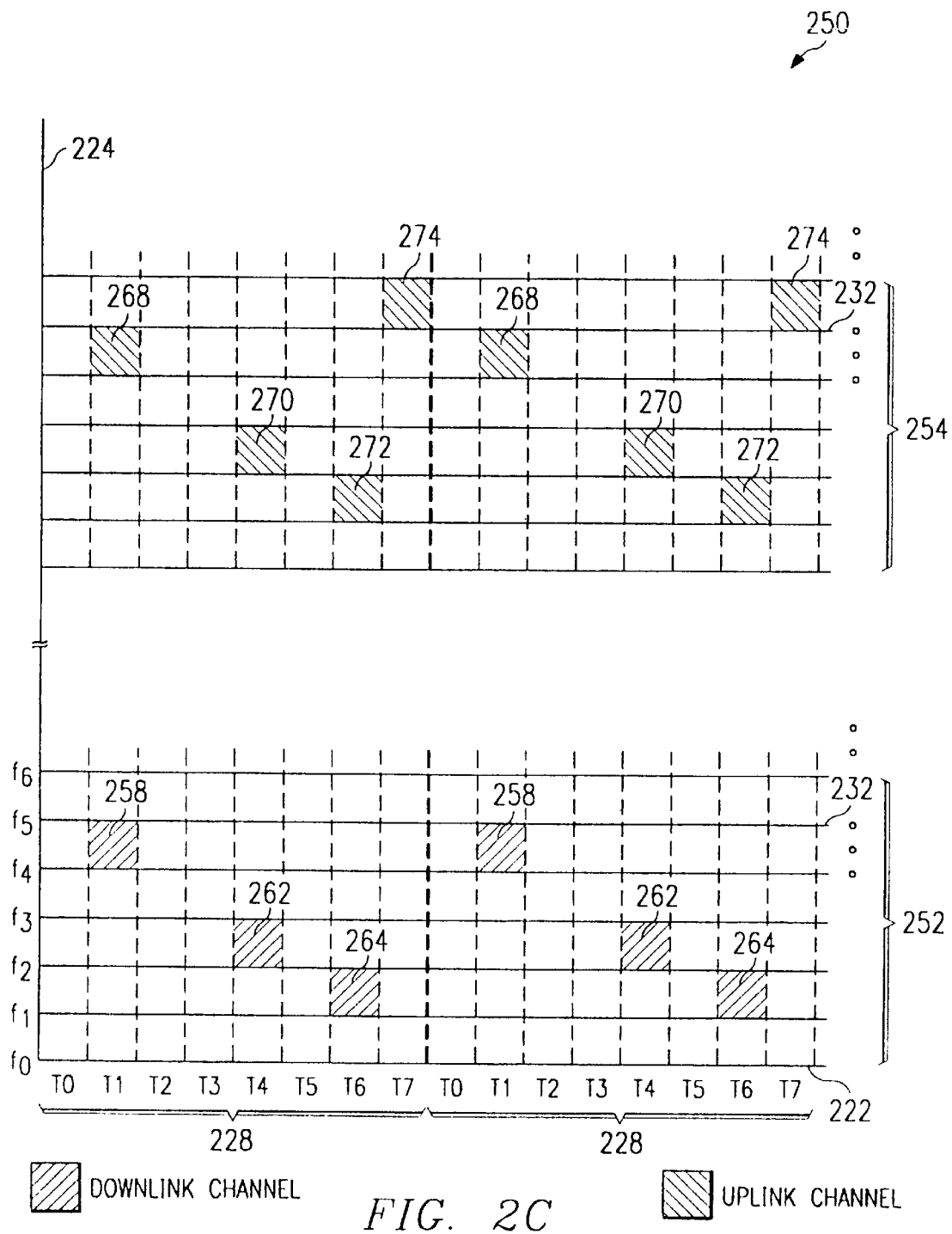
FIG. 2C illustrates graphically the channel scheme of another exemplary multi-slot, multi-carrier communication system.

FIG. 2C illustrates the channel scheme of another exemplary multi-carrier, multi-slot communication scheme, shown generally at 250. Again, the time axis 222 and frequency axis 224 are shown. Two frames 228 formed of time slots T0–T7 are also again shown. The available bandwidth is here divided into two sets, set 252 and set 254, of carriers 232. The carriers 232 of each set are again spaced-apart by 200 kHz spacings.

The scheme 250 is representative of a FDD scheme, such as that used in the GSM communication system. Time slot-carrier combinations which include carriers of the first set 252 form downlink channels. And, time slot-carrier combinations which include carriers of the second set 254 form uplink channels.

In the illustrated communication scheme, the downlink channels are formed of channels 258, 262, and 264. And, the uplink channels are formed of channels 268, 270, 272, and 274. In the exemplary scheme 250, the uplink channels are determined by selection of the downlink channels. In other embodiments, such downlink and uplink channel selection is made independently. In the illustrated embodiment, the downlink and uplink timeslots are not synchronized, and are therefore offset, timewise, from one another.

Figure 3A:
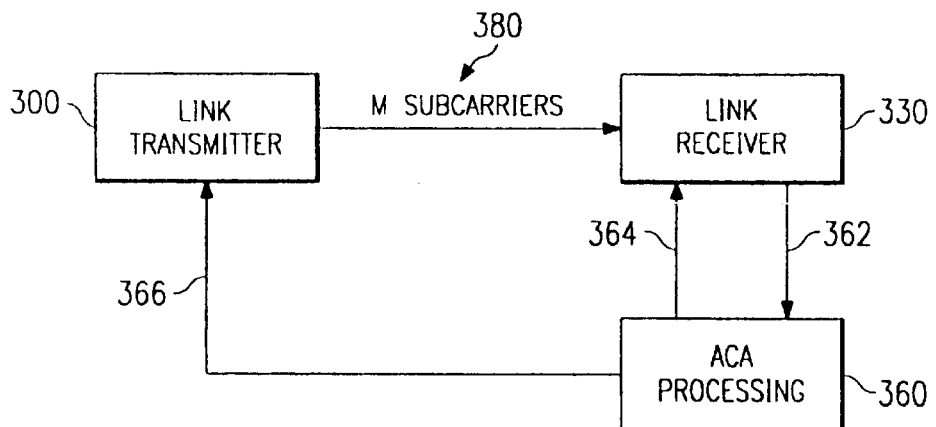
FIG. 3A illustrates a functional block diagram of a system according to an embodiment of the present invention.

Referring now to FIG. 3A, therein is shown a block diagram of a system according to the present invention. The system consists of a link transmitter 300, link receiver 330, ACA processing portion 360 and RF channel 380. The receiver 330 and transmitter 300 of a particular link are located at opposite ends of the link. In the downlink the receiver 330 is located in the mobile station and the transmitter 300 is located in the base station. In the uplink the receiver 330 is located in the base station and the transmitter 300 is located in the mobile station. RF channel has a set of N available channels. The link receiver 330 and link transmitter communicate over RF channel 380 using a subset of M of the available channels.

Figure 3B:
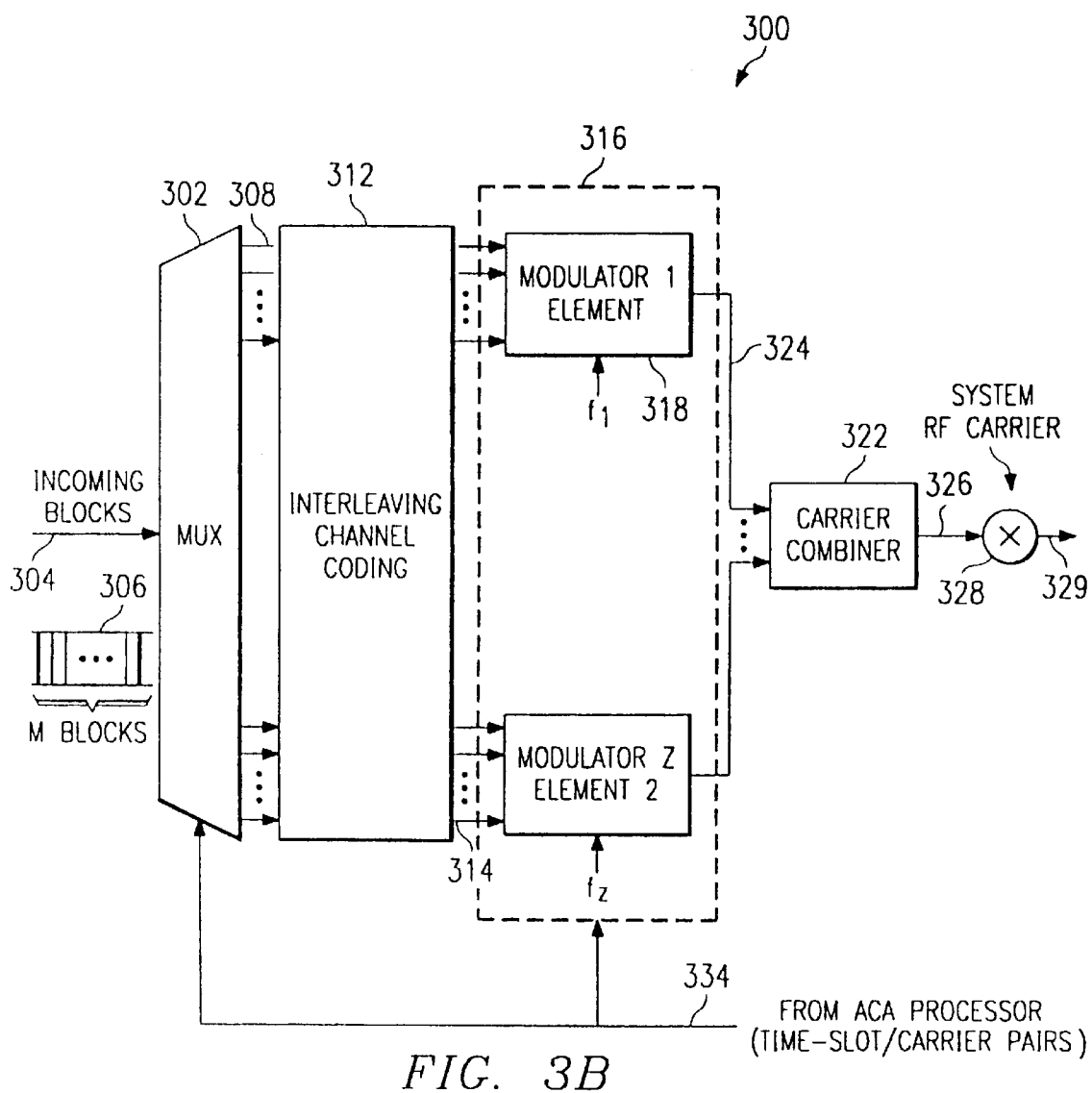
FIGS. 3B and 3C illustrate functional block diagrams of a link transmitter and link receiver, respectively, according to an embodiment of the present invention.
Figure 3C:
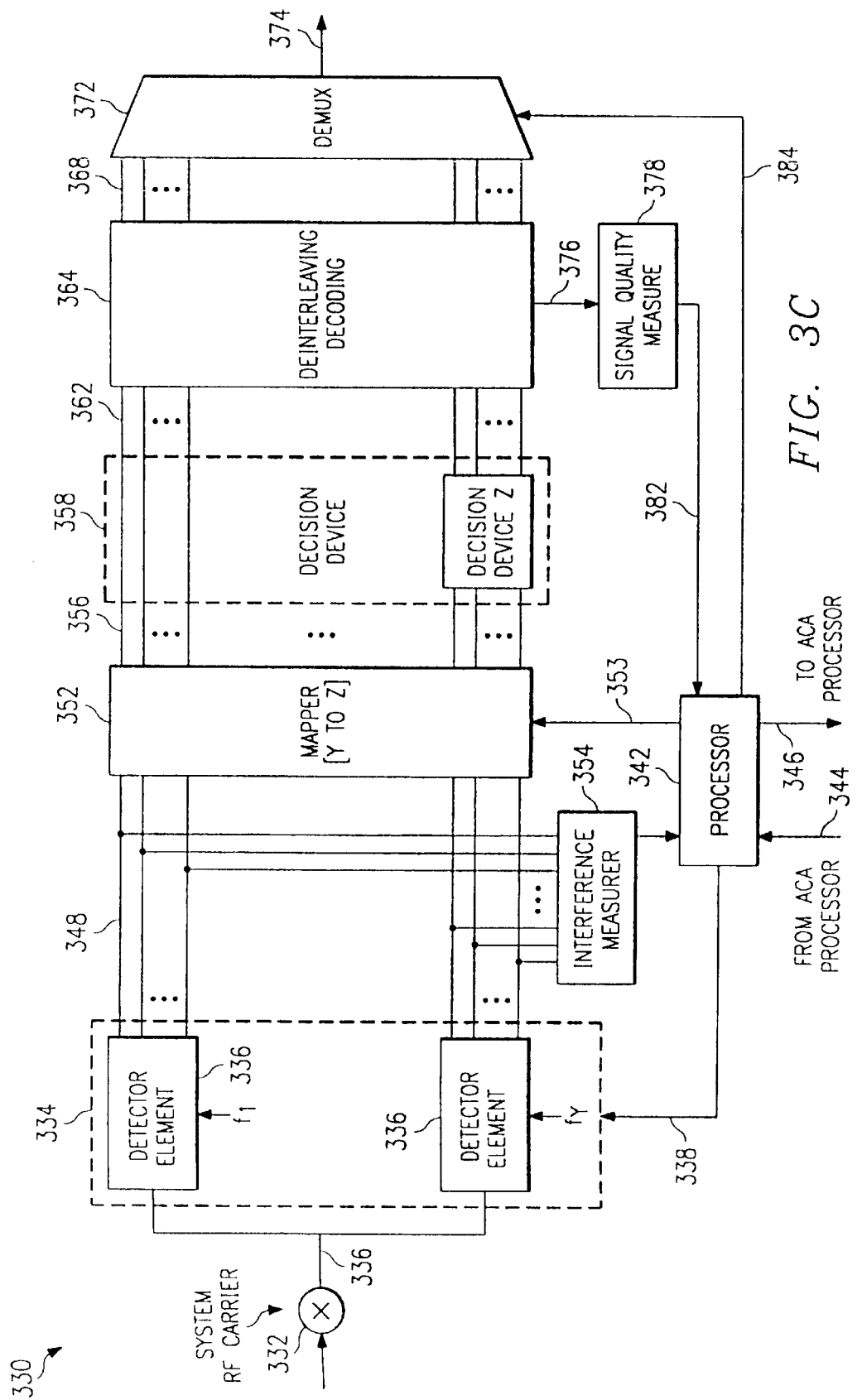

Referring now to FIGS. 3B and 3C, therein are shown functional block diagrams of transmitter 300 and receiver 330, respectively, of FIG. 3A. The functional features that are shown in FIG. 3B and FIG. 3C are common to both the base and mobile station receivers and transmitters.

Transmitter 300 includes a multiplexer 302. The multiplexer 302 is coupled to receive blocks of data applied thereto on line 304. M blocks 306 of data are illustrated in the figure. Such blocks 306 are applied to the multiplexer 302 by way of the line 304.

The multiplexer 302 is coupled by way of lines 308 to a coder and interleaver 312. The coder and interleaver 312 is coupled, by way of lines 314 to modulator 316. As illustrated, the modulator 316 includes a plurality, here Z, of modulator elements 318. The modulator elements 318 are coupled to a carrier/combiner 322 by way of lines 324. The carrier/combiner 322 is, in turn, coupled by way of line 326 to a first input of a mixer 328. A system RF carrier is applied to a second input of the mixer 328. And, output line 329 is coupled to an output of the mixer 328. Input signals provided by an ACA processor (not shown in the figure) pertaining at least to timeslot and carrier pairs are provided to the multiplexer 302 and to the modulator 316 by way of lines 334.

In transmitter operation, blocks of data are provided to the multiplexer 302 by of lines 304. Signals provided to the multiplexer 302 by way of lines 334 determine the timeslots upon which successive ones of the blocks 306 of data are transmitted by the transmitter. The successive ones of the blocks 306 of data multiplexed by the multiplexer 302 are provided by way of lines 308 to the channel coder and interleaver 312 to be channel-coded and interleaved with other data. Once channel-coded and interleaved with other data, the blocks of data are selectively applied, by way of lines 314, to modulator elements 318 of the modulator 316. As illustrated, several lines 314 extend to each modulator element 318, thereby to provide each modulator element 318 with several entries. Each entry provided to a modulator element 318 corresponds to a timeslot in the frame. Control signals provided by the ACA processor are determinative of which of the modulator elements 318 receive entries during selected timeslots.

Modulated signals generated by selected ones of the modulator elements 318 of the modulator 316 are provided by way of lines 324 to a carrier/combiner 322 whereat the carriers are combined. Thereafter, the combined signal is modulated up to an RF carrier frequency by way of the mixer 328. The number of carriers, Z, combined by the carrier/combiner 322 can vary between successive frames wherein the number of carriers Z is less than or equal to the number of M blocks of data.

a Receiver circuitry 330 includes a mixer 332 having a first input coupled to receive indications of signals received at the receiver. A second input to the mixer 332 is coupled to the RF carrier signal.

An output of the mixer 332 is coupled to a detector 334 by way of lines 336. As illustrated, the detector 334 includes a plurality, here Y, of detector elements 336. The detector 334 is further coupled to receive control signals generated on line 338 by way of a processor 342. The processor 342 receives control inputs from an ACA processor (not shown in FIG. 3C) on line 344 and transmits information to the ACA processor by way of line 346.

The detector 334 is coupled by way of lines 348 to mapper 352. The lines 348 are further coupled to interference measurer 354. The interference measurer 354, in turn, is coupled to the processor 342. And, the processor 342 is coupled to the mapper 352 by way of lines 353.

The mapper 352 is coupled by way of lines 356 to a decision device 358. The decision device 358 is, in turn, coupled by way of lines 362 to decoder and deinterleaver 364. The decoder and deinterleaver 364 is coupled, in turn, by way of lines 368, to a demultiplexer 372. A demultiplexed signal generated by the demultiplexer 372 is generated on line 374 and is provided to other receiver circuitry (not shown).

The decoder and deinterleaver 364 further generates signals on line 376 which is coupled to a signal quality measurer 378. The signal quality measurer 378 is coupled, by way of lines 382 to the processor 342. And, the processor is coupled to the demultiplexer 372 by way of lines 384.

In receiver operation, the ACA processor determines on what carriers a receive signal should be detected and provides indications of such determinations to the detector 334. The number of Y detector elements is at least as great as the Z number of carriers upon which signals are transmitted to the receiver 330.

Each output generated by the detector elements 336 on the lines 348 corresponds to a timeslot of a single frame. The interference measurer 354 measures signal energy of signals generated on the lines 348, thereby to obtain indications of interference on channels formed of frequency and timeslot combinations not be used to transmit informational signals. Indications of such measurements are provided to the processor 342 and, in turn, to the ACA processor.

The mapper 352 is operable responsive to the signals applied thereto by the processor on line 353 to map the signals generated by the Y detector elements 336 into a Z number of sets of lines 356 of carriers upon which signals are determined to have been transmitted. Such signals are provided to the decision device 358 and thereafter to the decoder and deinterleaver 364. Thereafter, the signal quality measurer 378 is provided signals on lines 376 to permit the measurer 378 to estimate signal quality levels on the channels upon which signals are transmitted. Such indications are provided to the processor 342 and, in turn, to the ACA processor. The demultiplexer 372 is operable in a manner reverse to that of the multiplexer shown previously in FIG. 3B.

The necessary data transfer between the mobile stations, base stations and MSCs of the system may be accomplished by known methods. In the described embodiment the DCCH and PCCH channels may be used on both the uplink and downlink to transfer measurement results or channel assignment messages between a mobile station and the system. The use of control channels to carry such information is known to those skilled in the art.

Figures 4A, 4B:
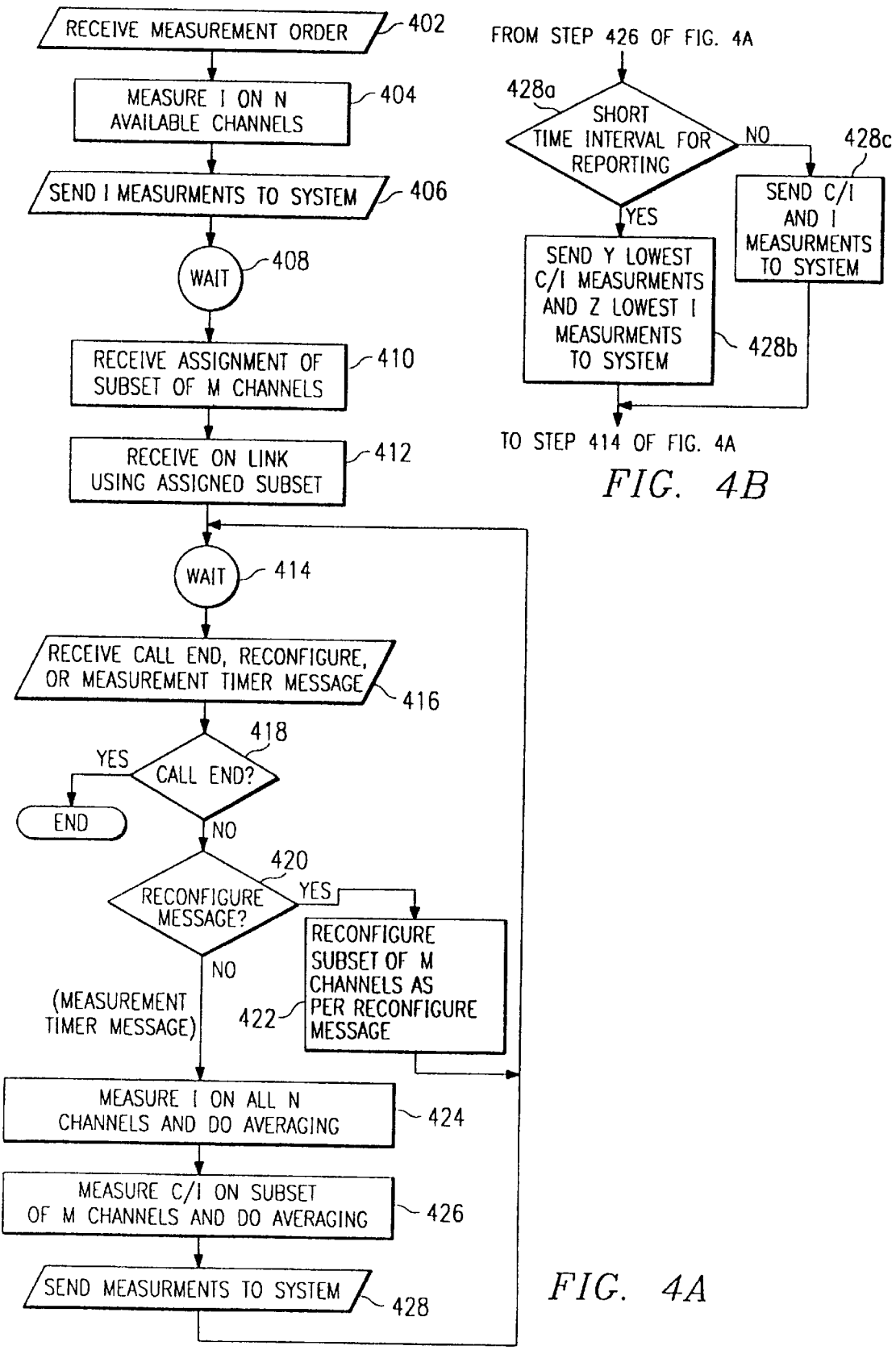
FIGS. 4A and 4B illustrate flow diagrams of process steps according to an embodiment of the present invention performed by a link receiver.

Referring now to FIG. 4A, therein is shown a flow diagram illustrating the steps performed by the link receiver 330 during the ACA process. The steps performed by a mobile station receiving on a downlink and the steps performed by a base station receiving on an uplink are essentially identical and FIG. 4A can be used to describe the steps performed by the link receiver 330 in both cases. The differences between the process steps performed in the mobile station and base station involve step 428 of FIG. 4A. FIG. 4B is a flow diagram that illustrates additional steps performed by the mobile station during step 428 of the ACA measurement process. These extra steps will be described with reference to FIG. 4B as the process of FIG. 4A is described.

The ACA process begins when it is necessary for the system to create a communications link between a mobile station and base station pair on either the uplink or the downlink. Referring again to FIG. 4A, at step 402 the link receiver receives from the system a measurement order message to measure interference (I) on each of a group of N channels available for the link. The N channels may be all channels available within the system or a smaller group of channels chosen from all channels available within the system. Next, at step 404 the I measurements are performed. Then, from step 404 the process moves to step 406 where the I measurement results are sent to the system. When a mobile station is the link receiver, the I measurement results are transmitted over the DCCH or PCCH channel to the base station and then transferred to the MSC. When a base station is the link receiver, the I measurement results are transferred to the MSC via the appropriate overland means. After transmitting the I measurement results the process moves to step 408 where the link receiver waits for a response from the system. The process steps that take place when the link receiver is in the wait state at step 408 will now be described with reference to FIG. 5.

Figure 5:
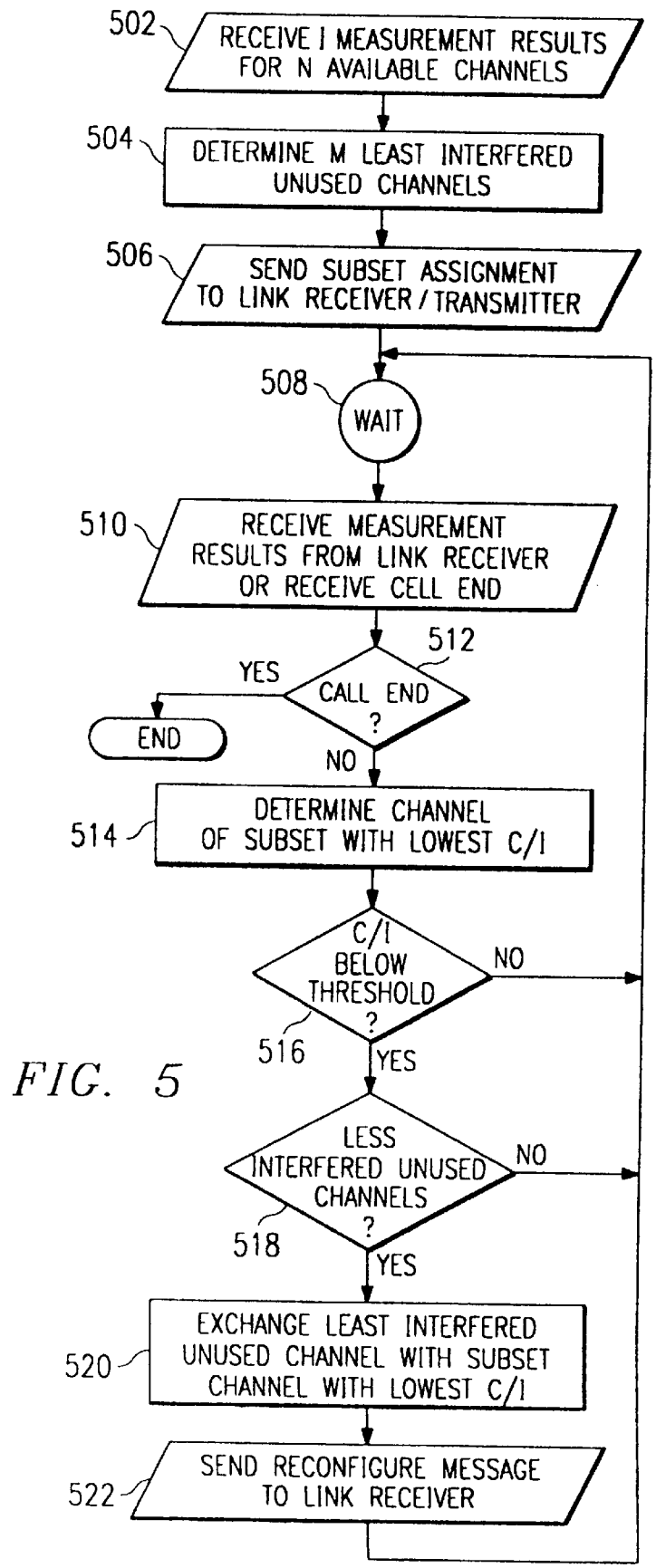
FIG. 5 illustrates a flow diagram of process steps according to an embodiment of the present invention performed within a cellular telecommunications network.

Referring now to FIG. 5, therein are shown the process steps performed within the ACA processing portion of system during the ACA process. At step 502 the results of the I measurement performed on the N channels at the link receiver are received by the ACA processor. Next, at step 504 the ACA processor determines the M least interfered unused channels from the results of the I measurements made on the N channels. From step 504 the process then moves to step 506 where a channel assignment message assigning the subset of the least interfered M channels to the link is sent to both the link receiver and the link transmitter. The ACA processor now moves to step 508 and waits for further input from the link receiver. The process flow now returns to step 408 FIG. 4A. Alternative methods of determining the M channels for the channel assignment message may be used in place of step 506. For example, the channels could be assigned on the basis of how their use effects transmissions in neighboring cells. If one of the least interfered M channels was used in a neighbor cell, the channel would not be used. In this case the M channels may not be the least interfered M channels.

Referring again to FIG. 4A, the link receiver which has been in the wait state at 408 now moves to step 410 and receives the channel assignment message assigning the subset of M channels to the link. Next, the process moves to step 412 as the link receiver begins receiving on the link using the assigned subset of M channels. From step 412 the process now moves to step 414 and waits for further input. At step 416 an input is received. The link receiver may receive three types of inputs while receiving using the assigned subset of M channels. At decision step 418 the link receiver determines if a call end signal has been received. If a call end signal has been received the process ends. The call end signal may have been transmitted by the system to the link receiver or initiated at the link receiver itself. A call end signal indicates to the process that communications on the link have terminated. If a call end has not been received, the process moves to step 420 and the link receiver determines whether a measurement timer message has been received. The measurement timer is contained in the processor associated with the link receiver. The measurement timer generates a measurement message at periodic intervals informing the link receiver to make measurements. Each measurement timer signal defines a measurement interval. If a measurement timer message has been received the process moves to step 424. At step 424 the link receiver measures I on the set of N channels. The I measurements may be averaged with the results of a certain number of previous I measurements for each channel to obtain accuracy. The first time through step 424 the measurements are averaged with the results obtained in step 404. On subsequent passes through step 424 the measurement results are averaged with the last n previous measurements, where n is a value allowing an accurate following of a channel's interference level within the system. From step 424 the process moves to step 426 and the link receiver measures C/I on each of the subset of M channels. The C/I measurements are also averaged with the last n previous C/I measurements. Then, at step 428 the link receiver sends the I and C/I measurement results to the ACA processing portion of the system. Depending on whether the link receiver is the base station or mobile station, step 428 may be performed in differing ways. If the link receiver is a base station the averaged measurement results may be sent directly to the ACA processor. If the link receiver is a mobile station in a downlink the substeps shown in FIG. 4B may be used to reduce signaling traffic as the results are transmitted to the system over the uplink via the base station.

Referring now to FIG. 4B, therein is shown a flow diagram illustrating process substeps performed by a mobile station performing step 428 of FIG. 4A. Signaling traffic on the uplink is reduced by transmitting differing sets of measurement results to the system over differing time intervals. Over long reporting intervals all I measurement and C/I measurement results are transmitted to the system. Over shorter reporting intervals a reduced set of each of the I measurement and C/I measurement results are transmitted. The long and short intervals may be defined so that a long interval occurs every nth short interval or every nth measurement period, where n is a number such as, for example, 25. At step 428a the mobile station determines whether the measurement period involves a short time interval for reporting measurement results. If it is determined that the measurement period involves a short time interval for reporting measurement results the process moves to step 428b, where the mobile station transmits the C/I measurements for the Y worst quality channels of the subset of M channels, where Y<M, and the I measurements for the Z least interfered of the N channels to the system, where Z<N. The values of Y and Z are chosen to allow adequate information for effective ACA while minimizing signaling traffic. Y may be set to 1 and Z may be set to a number calculated to contain on average the I measurement results of at least one channel not used within the same cell. The process then moves to step 414 where the mobile station waits for further input. However, if, at step 428a, it is determined that the measurement period does not involve a short time interval for reporting measurement results the process moves to step 428c. At step 428c the mobile station transmits the C/I measurements for the whole subset of M channels and the I measurements for all N channels to the system. The process then moves to step 414 where the mobile station waits for further input. The process flow now moves to FIG. 5 as the ACA processor receives the measurement results from the link receiver.

Referring again to FIG. 5, the ACA processor which has been in the wait state at step 508, receives an input from the link receiver at step 510. The ACA processor may receive measurement results or a call end signal at step 510. When an input is received the process moves to step 512 where it is determined what type of input was received. If a call end signal is received the process ends. In this example the received message is measurement results so the process moves to step 514. At step 514 the ACA processor determines the channel of the subset of M used channels with the lowest C/I measurement value. Next, at step 516 it is determined if the C/I of the lowest C/I measurement value of the subset of M channels is below the ACA C/I trigger threshold. If, at step 516, it is determined that the lowest C/I measurement value is not below the ACA C/I trigger threshold the process flow will return to step 508 where the ACA processor will wait for further input. If, however, at step 516 it is determined that the lowest C/I measurement value is below the ACA C/I trigger threshold the process flow will instead move to step 518. At step 518 the ACA processor determines whether an unused channel of the set of N channels exists which has an I measurement value less than the I measurement value of the channel of the subset of M with the lowest C/I measurement value. If at step 518 it is determined that no unused channel exists with a lower I measurement value, the process flow will return to step 508 where the ACA processor will wait for further input. If, however, at step 518 an unused channel exists with a lower I measurement value, a more preferred channel exists and, the process moves to step 520. At step 520 the ACA processor inserts the least interfered unused channel into the subset of M channels and removes the channel of the subset of M with the lowest C/I measurement value from the subset. To avoid hysterisis effects the change of channels may be performed after calculating a C/I for the least interfered unused channel during step 518 and determining that the calculated C/I is a minimum amount above the C/I of the channel to be removed. If the C/I for the least interfered unused channel is not a minimum amount above the C/I of the channel to be removed the unused channel can be considered not acceptable as a replacement. From step 520 the process moves to step 522 where the system sends a reconfigure subset message to the link receiver instructing the link receiver to reconfigure the subset of M channels assigned to the link to conform to the changes made by the processor. Then the ACA processor moves to step 508 and waits for further input from the link receiver. The procedure given by steps 514–520 could alternately be performed by determining a plurality of less interfered unused channels and exchanging these with a plurality of used channels having an interference level below the C/I threshold. The subset could also be reconfigured according to other criteria. For example, the subset of M could be reconfigured on the basis of the effect of using the subset, in the cell of the link, on communications occurring in neighbor cells. If some of the M channels used in the cell were also used in neighbor cells, these could be replaced with channels unused in the cell and also not used in neighbor cells. Reconfiguration could take place even if the used channels were not below a C/I threshold or even if the unused channel had an interference level greater than the replaced channel.

The process continues as long as a call is ongoing and communications on the link continue. The link receiver will next move from the wait state at step 408 upon receiving an input and the process steps shown in FIGS. 4A, 4B and 5 will be repeated until the call ends and a call end signal is received by the link transmitter, link receiver and ACA processing portion of the system.

In an alternative embodiment of the invention, a mobile station as link receiver transmits request messages requesting a certain subset of M channels, or requesting replacements for the M channels, to be used on the link. Signal measurement results need not be transmitted from the mobile station to the system. The system in turn transmits subset accepted or channel accepted messages to the mobile station. The downlink ACA processing mainly takes place in the processor 346 of the receiver in the mobile station. In this alternative embodiment steps 504, 514, 516, 518 and 520 shown in FIG. 5, which are performed by the system in the first embodiment, would be performed by processor 346 in the mobile station. The base station ACA process flow for uplink measurements remains as illustrated in FIGS. 4A, 4B and 5.

Figure 6A:
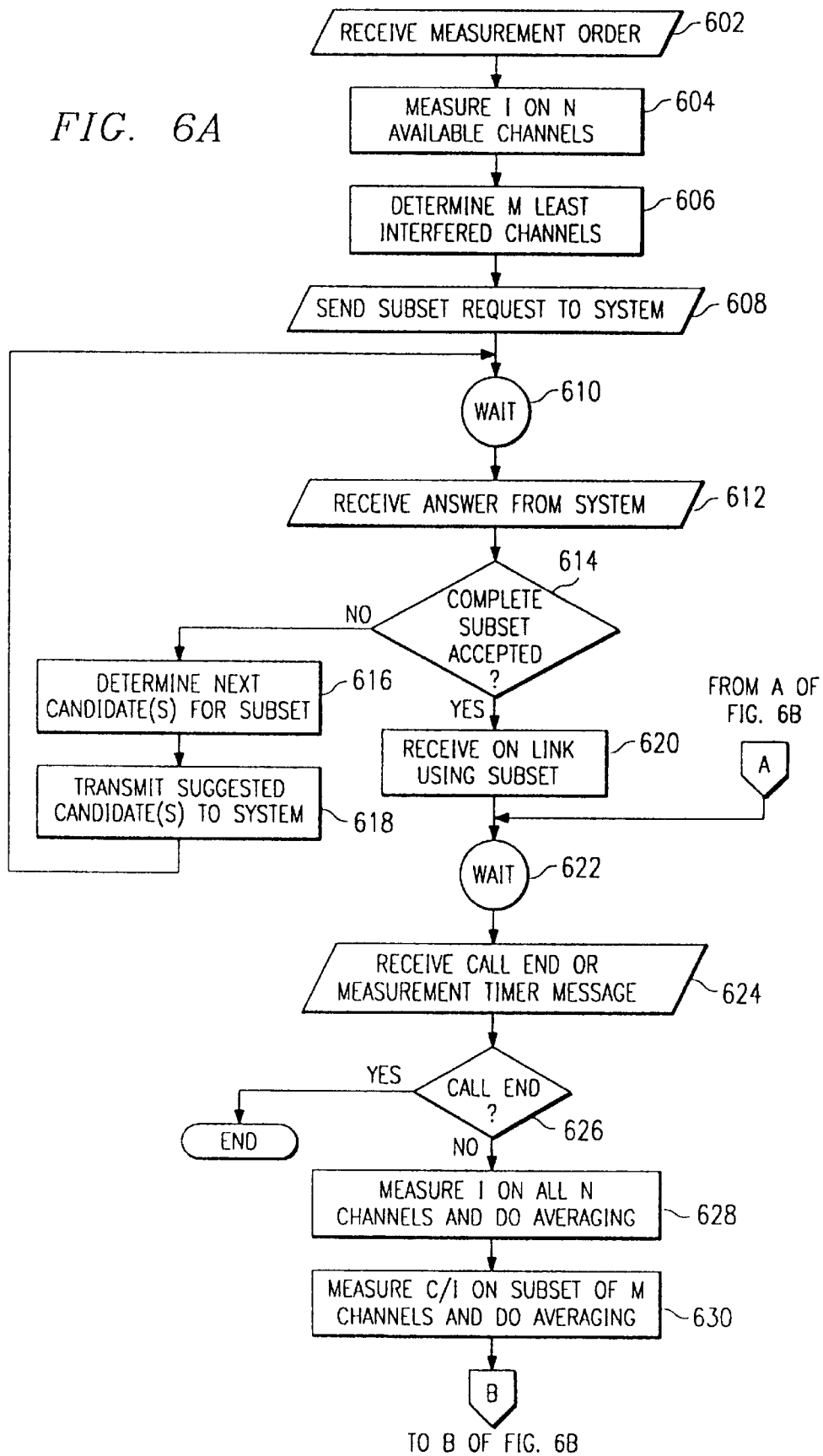
FIGS. 6A and 6B illustrate flow diagrams of process steps according to an alternative embodiment of the present invention performed by a link receiver.

Referring now to FIG. 6A, therein is shown a flow diagram illustrating the steps performed by a mobile station as the link receiver during the ACA process of the alternative embodiment of the invention. The ACA process begins when the mobile station receives a measurement order message at Step 602. Next, at Step 604 the interference (I) on each of the group of N channels available for the link is measured at the mobile station. Next, the process moves to Step 606 where the M least interfered channels are determined. From Step 606 the process moves to Step 608 and a subset request message is sent to the system by the mobile station. The subset request message indicates to the system that the mobile station requests the use of each channel in the requested subset. The process now moves to Step 610 and the mobile station waits for an answer from the system. The process steps that take place when the process is in the wait state at Step 610 will now be described with reference to FIG. 7.

Figure 7:
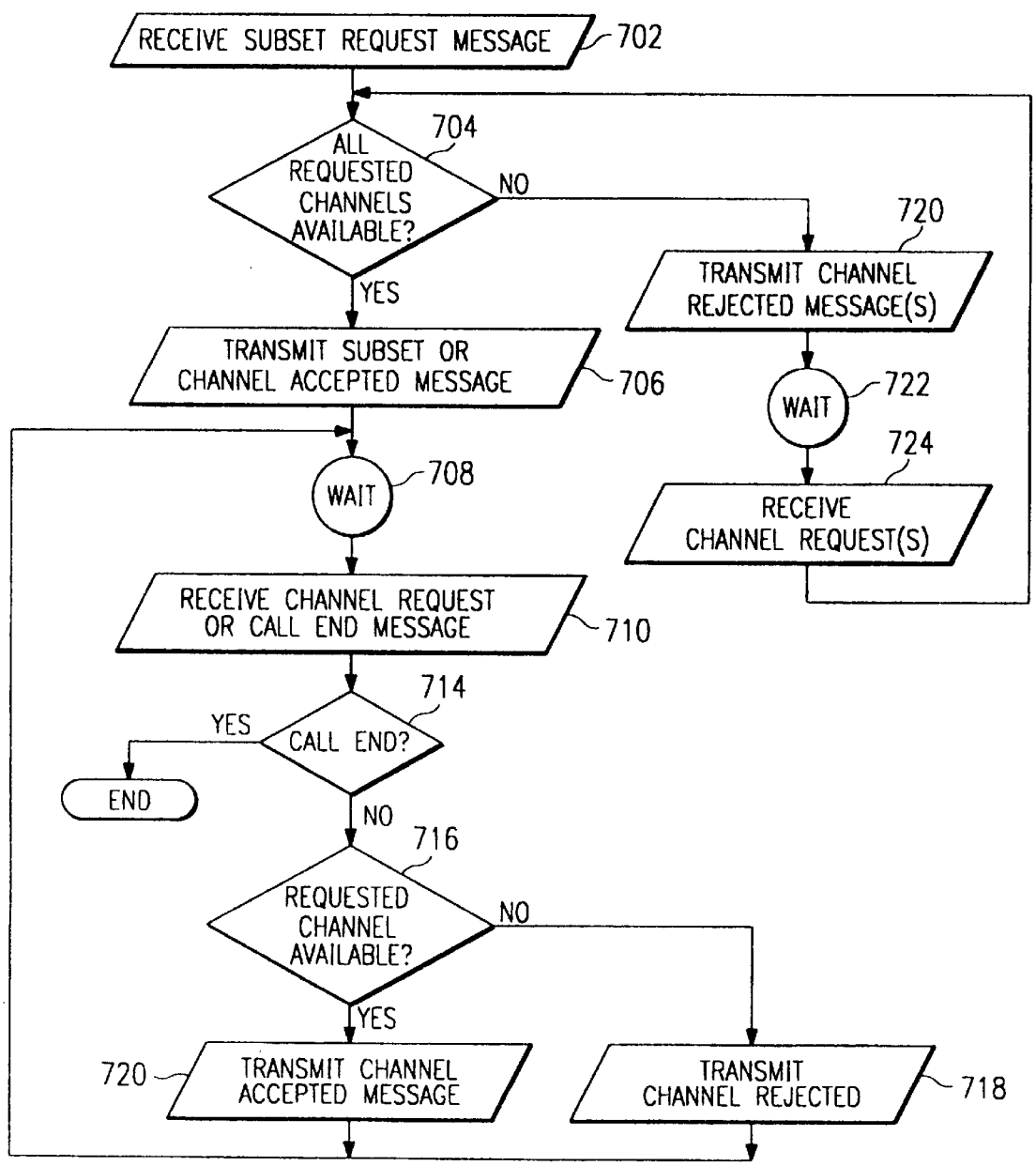
FIG. 7 illustrates a flow diagram of process steps according to an alternative embodiment of the present invention performed within a cellular telecommunications system.

Referring now to FIG. 7, therein are shown process steps performed within the ACA processing portion of the system according to the alternative embodiment of the invention when the mobile station is involved in the ACA process. At Step 702 the ACA processing portion receives the subset request message. Next, at Step 704 the system determines if the mobile is allowed to use all of the M channels in the requested subset. Certain channels may not be available for use in the cell, for example, if they are being used by another mobile station or, if they have been reserved within the system for special uses. The availability of the M channels may also be determined as to how their use effects transmissions in neighboring cells. The ACA is designed to allow flexibility to the system operators in making these decisions. If it is determined that the mobile station is allowed to use all M channels in the requested subset, the system will transmit a subset accepted message to the link receiver. If however, at Step 704, it is determined that channels of the suggested subset cannot be used by the mobile station, the process moves to Step 720 and the system transmits a channel rejected message rejecting the unavailable channels as part of the subset of M channels. The process flow now moves to Step 722 as the process waits for a reply from the mobile station.

Referring now to FIG. 6A, at Step 612 the mobile station receives a subset accepted message or channel rejection message transmitted from the system. If a subset acceptance message is received, the process moves to Step 620 where the link receiver begins receiving using the assigned subset. If however, at Step 614, it is determined that a channel rejected message(s) has been received, the process moves to Step 616. At Step 616, the link receiver determines the next candidate(s) to replace the rejected requested channel(s). These candidates would be the next least interfered channels of the set of N available channels that are not in the suggested set of M.

Figure 6B:
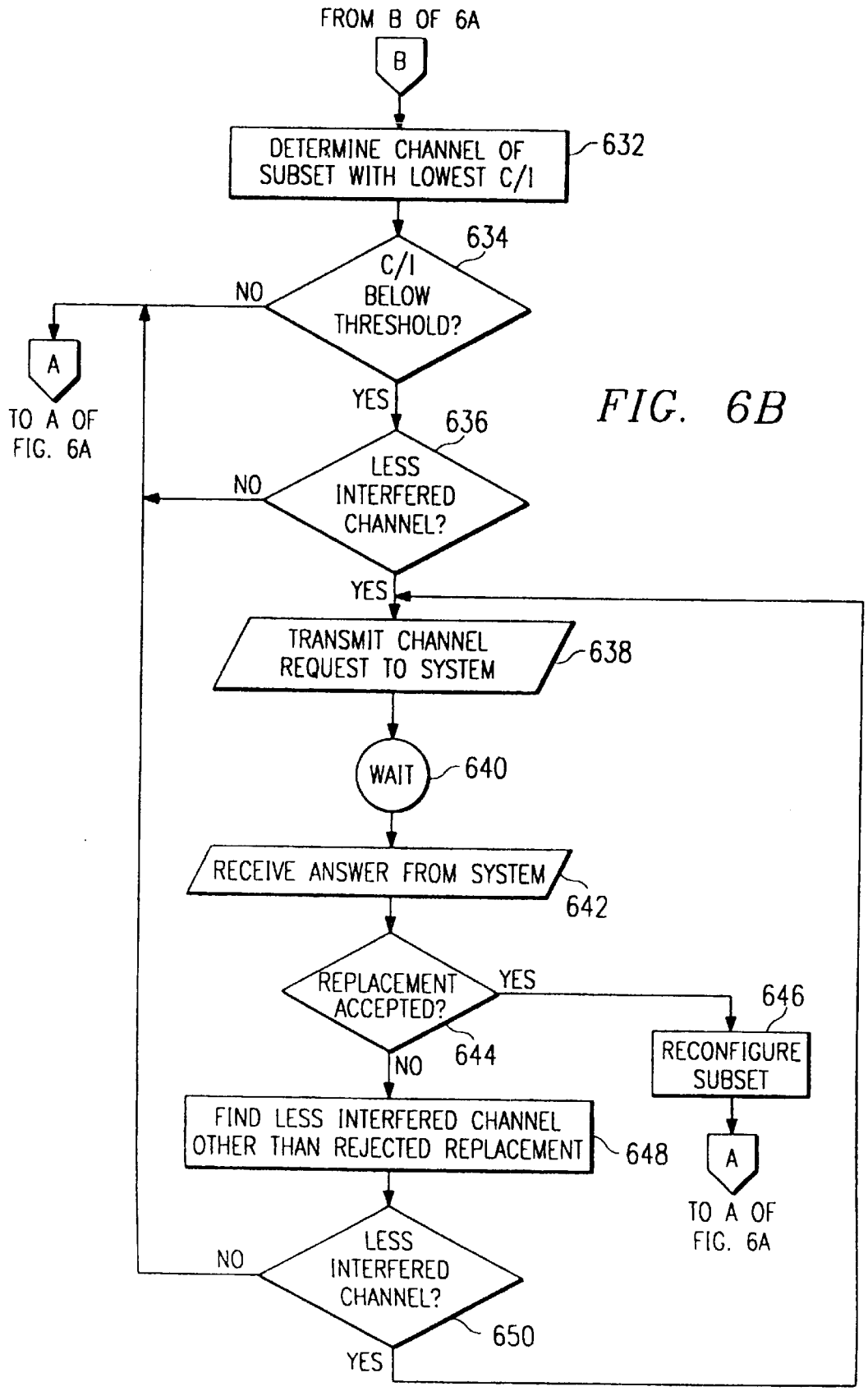

From Step 616 the process then moves to Step 618 where a channel request message requesting the use of next candidate channel(s) is transmitted to the system. The process then moves to Step 610 as the link receiver waits for an answer. The process will continue through the loops formed by the Steps 610, 612, 614, 616, 618, and, 706 and 708, until the complete subset of M channels is accepted. Then the process moves to Step 620 where the mobile station begins receiving on the link using the accepted subset. The process now moves to the wait state of Step 622. When in the wait state of Step 622 the process may receive either a call end or measurement timer message. The call end and measurement timer messages are equivalent to the call end and measurement messages described above for the previous embodiment of the invention. The link receiver receives the call end or measurement timer message at Step 624 and moves to Step 626 where it is determined if a call end was received. If a call end is received the process ends. If, however, a measurement timer message was received, the process moves to Step 628. At Step 628 the mobile station measures I on all N available channels and averages the results for each channel. Next, at Step 630, the link receiver measures C/I on the subset of M channels and averages the results for each channel. The process now moves to Step 632 of FIG. 6B.

At Step 632 the link receiver determines the channel of the subset of M with the lowest C/I. Next, at Step 634 it is determined if the lowest C/I is below a threshold. If it is not below the threshold, the process returns to Step 622 where the link receiver waits for another call end or measurement timer message. If, however, it is determined that the lowest C/I is below the threshold C/I, the process moves to Step 636. At Step 636 it is determined if a less interfered channel of the set of N not in the subset of M exists. If a less interfered channel does not exist the process returns to Step 622. If, however, a less interfered channel does exist, a more preferred channel exists and the process moves to Step 638. At Step 638 the mobile station transmits a channel request message to the system requesting the least interfered channel not in the subset of M channels as a replacement for the channel with the lowest C/I. The process within the mobile station now moves to the wait state of Step 640 and the process flow moves to Step 708 of FIG. 7. The ACA processing portion of the system receives the requested channel message at Step 710. The procedure outline in steps 632–638 could alternately be performed by determining a plurality of used channels with the lowest C/Is of the subset and then determining a plurality of less interfered unused channels as requested replacements. After receiving the channel requested message it is determined, at step 716, if the requested channel is used within the cell on a link with another mobile station. If the requested channel is used within the cell the system moves to Step 718 and transmits a requested channel rejected message to the mobile station and the process returns to Step 708. If, however, the suggested replacement is unused within the cell, the system transmits a requested channel accepted message to the mobile station and the process returns to Step 708. As an alternative to determining if the requested channel is used with the cell, other criteria may also be used to determine availability. For example, if the requested channel is used in a neighbor cell the system could reject the channel request. The process then moves from the wait state of Step 640 to Step 642 as the mobile station receives the acceptance or rejection message. Next, at Step 644, it is determined if the requested channel was accepted. If the requested channel was accepted the process moves to Step 646 and the mobile station reconfigures the subset of M channels on which the mobile station is receiving to include the requested channel and deletes the channel with the lowest C/I. Then, the process moves to the wait state of Step 622. If, however, the requested channel is not accepted the process moves to Step 648. At Step 648 the mobile station determines if a new candidate channel less interfered than the channel of M channels with the lowest C/I, that has not been already rejected as a requested channel within this measurement interval, exists. If a new candidate channel does not exist the process moves back to the wait state of Step 622. If, however, a new candidate channel does exist, the process moves to Step 638 where the mobile station transmits a channel request message to the system. The message requests the new candidate channel found at Step 648 as the new replacement channel. The process then moves to Step 640 and waits for an answer from the system. The process will continue through the loops formed by Steps 642, 644, 648, 650, and, 638 and 710, 712, 714, and 716 or 718, until a requested channel is accepted or no new candidate exist. The process then moves to the wait state of Step 622. The ACA process will continue throughout the call and be invoked each time a measurement timer message is received. When the call ends, the process will end through Steps 624 and 626.

Figure 8:
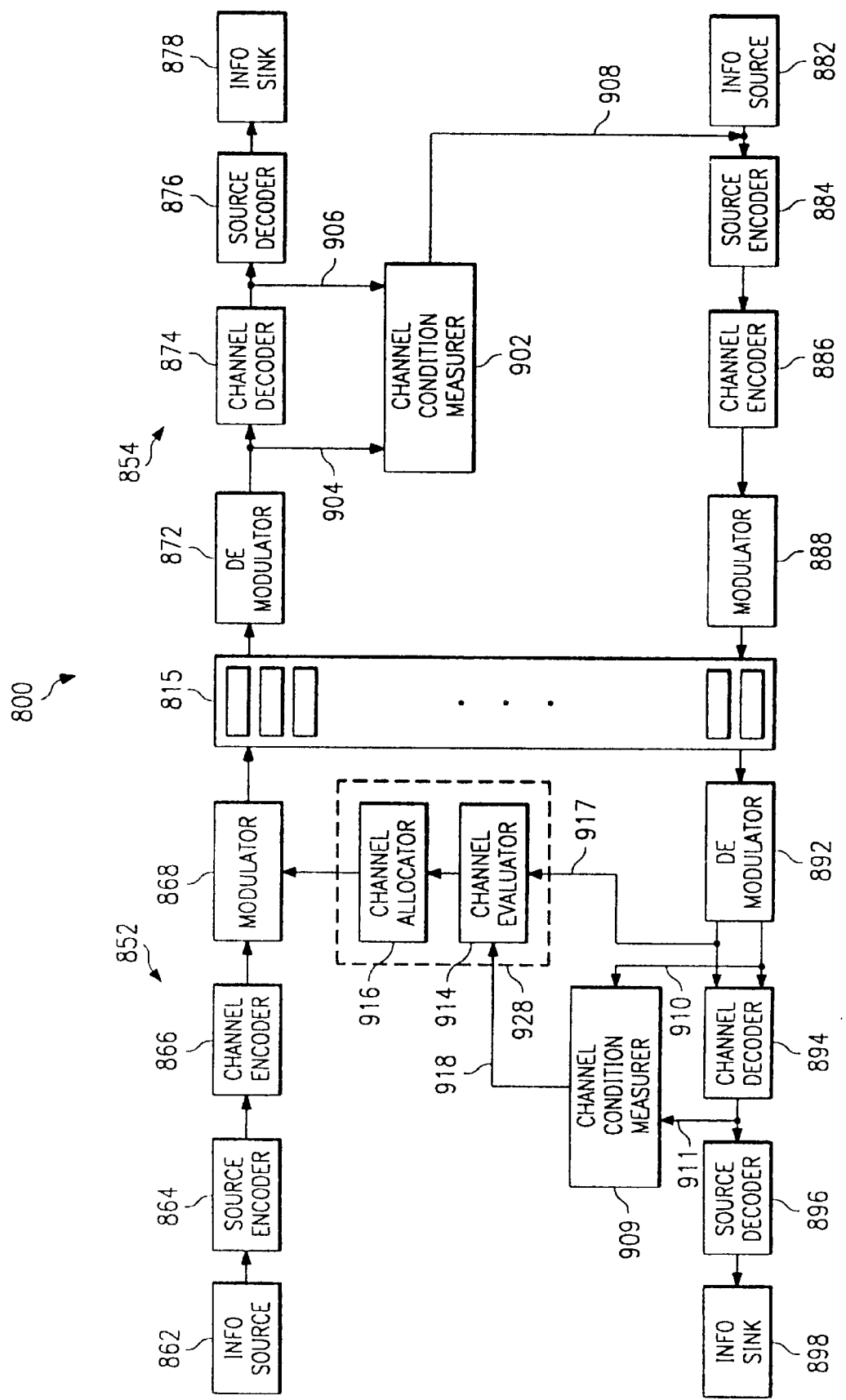
FIG. 8 illustrates a functional block diagram of a base station and mobile terminal operable pursuant to an embodiment of the present invention.

FIG. 8 illustrates a portion of a cellular communication system 800 in which an embodiment of the present invention is operable. A base station 852 and a single mobile terminal 854 is shown to be coupled by way of a communication link 815, thereby to permit the transmission of downlink and uplink signals therebetween. The system 800 is operable pursuant to a multi-slot, multi-carrier communication scheme in which the downlink and uplink comprises pairs of time slots and carriers, as described previously.

The base station 852 receives, or generates, an information signal, here shown to be generated by an information source 862. An information signal generated by the information source 862 is encoded by a source encoder 864. The source encoder, in one embodiment, digitizes the information signal applied thereto. A source-encoded signal generated by the encoder 864 is applied to a channel encoder 866. The channel encoder 866 channel-encodes the signal applied thereto, e.g., by increasing the redundancy of the signal applied thereto.

A channel-encoded signal generated by the encoder 866 is applied to a modulator 868 which modulates the channel-encoded signal according to the multi-slot, multi-carrier communication scheme. That is to say, the modulator modulates the channel-encoded signal upon a selected carrier and transmits the modulated signal during selected time slots. The signals generated by the modulator 868 form the downlink transmissions which are communicated to the mobile terminal 854 by way of the link created therebetween.

The mobile terminal 854 includes a demodulator 872 for demodulating the downlink transmissions received thereat. The modulated signals demodulated by the demodulator 872 are applied to a channel decoder 874 which decodes the channel encoding in a process reverse to that used by the channel encoder 866 to encode the signal. Thereafter, a source decoder 876 decodes a signal applied thereto and applies a decoded signal generated therefrom to an information sink 878.

The mobile terminal further includes an information source 882 at which an information signal to be communicated to the base station 852 is generated. The information signal generated at the information source 882 is encoded by a source encoder 884 which, analogous to the source encoder 864, might include an analog-to-digital converter for digitizing the information signal applied thereto.

The source-encoded signal generated by the source encoder 884 is applied to a channel encoder 886 which channel-encodes the signal applied thereto, e.g., by introducing redundancies upon the signal applied thereto. A channel-encoded signal generated by the encoder 886 is applied to a modulator 888. The modulator 888 is operable in a manner analogous to operation of the modulator 868 to modulate the encoded signal upon a carrier of a selected frequency and to transmit the modulated signal during a selected time slot. The selected time slot and carrier define the channel forming the uplink between the mobile terminal 854 and the base station 852.

The base station is further shown to include a demodulator 892 operable to demodulate the uplink transmission received thereat. A demodulated signal generated by the demodulator is applied to a channel decoder 894 which decodes the received signal in a process generally reverse to that of the process used by the channel encoder 886 to encode the signal generated thereat. A decoded signal generated by the decoder 894 is applied to a source decoder 896 which generates a source decoded signal which is applied to an information sink 898.

In the illustrated embodiment, a channel condition measurer 902 forms a portion of the mobile terminal 854. The channel condition measurer 902 is operable to measure channel conditions of channels available to form the link 815 between the base station 852 and mobile terminal 854. In one embodiment, the channel condition measurer measures the interference levels of a plurality of at least some of the N available channels, available to form the link 815. Such measurements may be made responsive to signal levels of signals applied to the measurer 902 by way of a tap 904.

In the illustrated embodiment, the channel condition measurer 902 is further operable to measure levels of multi-path fading exhibited upon channels upon which signals are transmitted to the mobile terminal 854. Indications of such multi-path fading are provided to the channel condition measurer 902 by way of the tap 906.

Measured values of the channel condition exhibited by the channels are applied to the transmit portion of the mobile terminal 854, here indicated by way of a tap 908. As noted previously, in one embodiment, the measured indications of channel conditions are provided to the base station 852 by way of a control channel.

In the illustrated embodiment, a channel condition measurer 909 is operable, in manners analogous to that of the measurer 902, to measure the channel conditions of the channels available to form the link 815 between the base station 852 and the mobile terminal 854. Taps 910 and 911 provide the measurer 909 with indications of the interference and multipath fading, respectively.

An ACA processor 928 is here shown to include a channel evaluator 914 and channel allocator 916. In another embodiment, the processor 928 instead forms a portion of an MSC. In other embodiments, the ACA processor 928 is located elsewhere, or is distributed to have portions embodied in more than one device.

Indications of measured values, measured by the measurer 902 or 909 are provided to the channel evaluator by way of taps 917 and 918, respectively. The channel evaluator which evaluates the channel characteristics determined by the determiner. Responsive to evaluations made by the evaluator 914, the channel allocator 916 is operable to allocate channels to form the link 815 between the base station 852 and the mobile terminal 854. Channel allocations allocated by the allocator 916 allocate channels which create the downlink as well as the uplink between the base station and mobile terminal. In one embodiment, indications of the channels allocated by the allocator 916 to form the uplink are transmitted upon control channels to the mobile terminal 854.

Because the channels are dynamically allocated to form the communication link 815 between the base station 852 and mobile 854 channel allocations of channels to be used to form the link between the base station and mobile terminal are changed, as necessary.

As can be seen from the above description, the invention provides a method and system of adaptive channel allocation for a multi-slot, multi-carrier communication scheme. Use of the invention will enhance the performance of such systems into which it is implemented. The adaptive channel allocation is designed to minimize the signaling resources necessary to carry measurement results on the system uplinks will still provide the benefits of adaptive channel allocation. The result is a system with less dropped calls and better quality communications for each link.

It is believed that the operation and construction of the present invention will be apparent from the foregoing description and, while the invention shown and described herein has been characterized as particular embodiments, changes and modifications may be made therein without departing from the spirit and scope of the invention as defined in the following claims.

What is claimed is:

1. In a Frequency Division Multiplexing (FDM) telecommunications system in which communications from a link transmitter to a link receiver are transmitted pursuant to a Time Division Multiple Access (TDMA) communication scheme over a link using a subset of a set of a plurality of channels available to the link, a method of allocating channels for communications on the link, said method comprising the steps of:

allocating a plurality of channels from said set to provide said subset, wherein each channel includes at least one carrier and at least one time slot in accordance with the TDMA communication scheme;

measuring an interference level (I) on each channel of said set;

measuring a signal quality level (C/I) on each channel of said subset;

determining a channel of said subset with a lowest signal quality level (C/I); and determining if an unused channel exists in said set that has the interference level (I) lower than the interference level (I) of said channel of said subset with said lowest signal quality level (C/I); and reconfiguring said subset in response to an affirmative determination.

2. The method of claim 1 in which said step of allocating comprises the step of determining said subset, said subset comprising a plurality of least interfered channels of said set.

3. The method of claim 1 in which said step of reconfiguring comprises the steps of:

removing said channel with said lowest signal quality level (C/I) from said subset in response to an affirmative determination; and inserting said unused channel into said subset.

4. The method of claim 1 in which said step of measuring an interference level (I) further comprises the step of:

transmitting a plurality of results of said interference level (I) measurements from said link receiver to said system; and, said step of measuring a signal quality level (C/I) further comprises the step of:

transmitting a plurality of results of said signal quality level (C/I) measurements from said link receiver to said system.

5. The method of claim 1 in which said step of allocating comprises the steps of:

determining a candidate subset, said candidate subset comprising a plurality of least interfered channels of said set;

transmitting a subset request message from said link receiver to said system;

receiving an answer message from said system at said link receiver; and determining in response to the received answer message whether said candidate subset was accepted as the subset of channels for said link.

6. The method of claim 5 in which said step of receiving an answer message comprises receiving a candidate subset accepted message or a channel rejected message.

7. The method of claim 6 in which said step of receiving a channel rejected message further comprises the steps of:

determining one or more next candidate channels;

transmitting one or more channel request messages from said link receiver to said system; and repeating said steps of determining one or more next candidate channels and transmitting one or more channel request messages to said system until a complete candidate subset is accepted.

8. In a Frequency Division Multiplexing (FDM) telecommunications network in which communications from a link transmitter to a link receiver are transmitted pursuant to a Time Division Multiple Access (TDMA) communication scheme over a link using a subset of a set of a plurality of channels available to the link, a system for allocating channels for communications on the link, said system comprising:

means for allocating a plurality of channels from said set to provide said subset, wherein each channel includes at least one carrier and at least one time slot in accordance with the TDMA communication scheme;

means for measuring an interference level (I) on each channel of said set;

means for measuring a signal quality level (C/I) on each channel of said subset;

means for determining if an unused channel exists in said set that is more preferred for use on said link than any of the channels of said subset, said means for determining further comprises:

means for determining a channel of said subset with a lowest signal quality level (C/I); and means for determining if the unused channel of said set has the interference level (I) lower than the interference level (I) of said channel of said subset with said lowest signal quality level (C/I); and means for reconfiguring said subset in response to an affirmative determination.

9. The system of claim 8 in which said means for allocating comprises means for determining a subset, said subset comprising a plurality of least interfered channels of said set.

10. The system of claim 8 in which said means for reconfiguring comprises:

means for removing said channel with said lowest signal quality level (C/I) from said subset in response to an affirmative determination; and means for inserting said unused channel into said subset.

11. The system of claim 8 in which said means for measuring an interference level (I) further comprises:

means for transmitting a plurality of results of said interference level (I) measurements from said link receiver to said system; and, said means for measuring a signal quality level (C/I) further comprises:

means for transmitting a plurality of results of said signal quality level (C/I) measurements from said link receiver to said system.

12. The system of claim 8 in which said means for allocating further comprises:

means for determining a candidate subset, said candidate subset comprising a plurality of least interfered channels of said set;

means for transmitting a subset request message from said link receiver to said system;

means for receiving an answer message from said system at said link receiver; and means for determining, in response to the received answer message, whether said candidate subset was accepted as the subset of channels for said link.

13. The system of claim 12 in which said means for receiving an answer message comprises means for receiving a candidate subset accepted message or a channel rejected message.

14. The system of claim 13 in which the means for receiving a channel rejected message further comprises:

means for determining one or more next candidate channels;

means for transmitting one or more channel request messages from said link receiver to said system; and means for repeating said steps of determining one or more next candidate channels and transmitting one or more channel request messages to said system until a complete candidate subset is accepted.

15. In a Frequency Division Multiplexing (FDM) telecommunications system in which communications from a link transmitter to a link receiver are transmitted pursuant to a Time Division Multiple Access (TDMA) communication scheme over a link using a subset of a set of a plurality of channels each including at least one carrier and at least one time slot, a method of allocating channels for communications on the link, said method comprising the steps of:

allocating a plurality of channels from said set to provide said subset;

measuring a received signal on each channel of said set;

determining if a candidate channel of said set exists that is more preferred for use on said link than a channel of said subset;

transmitting a channel request message from said link receiver to said system;

receiving an answer from said system at said link receiver;

determining from said answer if said candidate channel is unused;

repeating, in response to a negative determination, the steps of determining if a channel of said set exists that is more preferred, transmitting a channel request, receiving an answer, and determining from said answer, each time with a different candidate channel, until said step of determining from said answer results in an affirmative determination; and reconfiguring said subset in response to an affirmative determination.

16. The method of claim 15 in which said step of measuring a received signal on each channel of said subset comprises the steps of:

measuring an interference level (I) on each channel of said set; and measuring a signal quality level (C/I) on each channel of said subset; and said step of determining if a candidate channel exists in said set that is more preferred for use on said link than a channel of said subset further comprises the steps of:
determining a channel of said subset with a lowest signal quality level (C/I); and
determining a candidate channel of said set that has an interference level (I) lower than the interference level (I) of said channel of said subset with said lowest signal quality level (C/I).

17. In a Frequency Division Multiplexing (FDM) telecommunications network in which communications from a link transmitter to a link receiver are transmitted pursuant to a Time Division Multiple Access (TDMA) communication scheme over a link using a subset of a set of a plurality of channels each including at least one carrier and at least one time slot, a system for allocating channels for communications on the link, said system comprising:

means for allocating a plurality of channels from said set to provide said subset;

means for measuring a received signal on each channel of said subset;

means for determining if a candidate channel of said set is more preferred for use on said link than a channel of said subset;

means for transmitting a channel request message from said link receiver to said system;

means for receiving an answer from said system at said link receiver; and means for determining from said answer if said candidate channel is unused; and means for reconfiguring said subset in response to an affirmative determination.

18. The system of claim 17 in which said means for measuring a received signal on each channel of said subset comprises:

means for measuring an interference level (I) on each channel of said set; and means for measuring a signal quality level (C/I) on each channel of said subset; and said means for determining if a candidate channel exists in said set is more preferred for use on said link than a channel of said subset further comprises:
means for determining a channel of said subset with a lowest signal quality level (C/I); and
means for determining a candidate channel of said set that has an interference level (I) lower than the interference level (I) of said channel of said subset with said lowest signal quality level (C/I).

* * * * *

UNITED STATES PATENT AND TRADEMARK OFFICE
CERTIFICATE OF CORRECTION

PATENT NO. : 5,956,642
DATED : Sep. 21, 1999
INVENTOR(S) : Larsson et al.

It is certified that error appears in the above-identified patent and that said Letters Patent is hereby corrected as shown below:

Column 1, lines 9-11   Replace "co-pending and commonly-assigned patent application Ser. No. 08/493,489, filed on Jun. 22, 1995" With --commonly-assigned U.S. Patent No. 5,726,978--

Column 3, line 37   Replace "co-pending patent application" With --U.S. Patent No. 5,726,978--

Column 9, line 64   Replace "a Receiver" With --Referring to FIGURE 3C, the receiver--

Signed and Sealed this

Twenty-third Day of May, 2000

Attest:

Q. TODD DICKINSON

*Attesting Officer*    *Director of Patents and Trademarks*